(12) United States Patent
D'Alto et al.

(10) Patent No.: US 10,157,549 B2
(45) Date of Patent: Dec. 18, 2018

(54) COMPUTER-IMPLEMENTED METHOD AND SYSTEM FOR ESTIMATING IMPACT OF NEW OPERATIONAL CONDITIONS IN A BASELINE AIR TRAFFIC SCENARIO

(71) Applicant: THE BOEING COMPANY, Chicago, IL (US)

(72) Inventors: Luis P. D'Alto, Madrid (ES); Marco La Civita, Madrid (ES); Javier Lopez, Madrid (ES); Miguel Angel Vilaplana Ruiz, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/155,754

(22) Filed: May 16, 2016

(65) Prior Publication Data
US 2016/0371989 A1     Dec. 22, 2016

(30) Foreign Application Priority Data
Jun. 22, 2015   (EP) .................................... 15173095

(51) Int. Cl.
| | | |
|---|---|---|
| G08G 5/00 | (2006.01) | |
| G06Q 10/04 | (2012.01) | |
| G06Q 10/06 | (2012.01) | |
| G06Q 50/30 | (2012.01) | |

(52) U.S. Cl.
CPC ......... *G08G 5/0095* (2013.01); *G06Q 10/047* (2013.01); *G06Q 10/06312* (2013.01); *G06Q 50/30* (2013.01)

(58) Field of Classification Search
None
See application file for complete search history.

(56) References Cited

U.S. PATENT DOCUMENTS

| | | | |
|---|---|---|---|
| 2013/0338910 A1* | 12/2013 | Vilaplana ............. | G06Q 10/047 701/122 |
| 2014/0277853 A1* | 9/2014 | Castillo-Effen ...... | G08G 5/0095 701/3 |
| 2015/0338853 A1* | 11/2015 | Casado Magana .. | G05D 1/0676 701/5 |
| 2016/0343258 A1* | 11/2016 | Navarro ................. | G01C 21/20 |

* cited by examiner

*Primary Examiner* — Krishnan Ramesh
(74) *Attorney, Agent, or Firm* — Patterson + Sheridan, LLP

(57) ABSTRACT

A computer-implemented method, system and computer program product for estimating the impact of new operational conditions in a baseline air traffic scenario. The system comprises: an intent inference module for retrieving flight track data and associated aircraft type information of a flight in a baseline air traffic scenario, and inferring an aircraft intent that fits the flight track data; an intent generation module for, using an alternative air traffic scenario based on the baseline air traffic scenario with new operational conditions, generating an aircraft intent for each flight in the alternative air traffic scenario that fits the new operational conditions; a trajectory computation module for computing the trajectory of each flight in the baseline and alternative air traffic scenario using their aircraft intent; an evaluation module for computing a trajectory-based analytics on each computed trajectory of the baseline and alternative air traffic scenario using a set of metrics.

19 Claims, 10 Drawing Sheets

| TOW [kg] | nPL [kg] | sPL [kg] | nFB [kg] | sFB [kg] | ΔPL [kg] | ΔFB [kg] |
|---|---|---|---|---|---|---|
| 39116 | 4488 | 4767 | 3145 | 3010 | 279 | 136 |
| 43718 | 8694 | 8987 | 3339 | 3196 | 293 | 143 |
| 48320 | 12861 | 13173 | 3551 | 3399 | 311 | 152 |

Fig. 10A

| TOW [kg] | nPL [kg] | sPL [kg] | nFB [kg] | sFB [kg] | ΔPL [kg] | ΔFB [kg] |
|---|---|---|---|---|---|---|
| 39581 | 4323 | 4394 | 3453 | 3418 | 71 | 35 |
| 44238 | 8509 | 8585 | 3682 | 3645 | 76 | 37 |
| 48894 | 12647 | 12727 | 3935 | 3896 | 80 | 39 |

Fig. 10B

| TOW [kg] | nPL [kg] | sPL [kg] | nFB [kg] | sFB [kg] | ΔPL [kg] | ΔFB [kg] |
|---|---|---|---|---|---|---|
| 39394 | 4375 | 4464 | 3336 | 3292 | 89 | 43 |
| 44028 | 8564 | 8659 | 3553 | 3507 | 95 | 46 |
| 48663 | 12711 | 12813 | 3791 | 3741 | 102 | 50 |

Fig. 10C

| TOW [kg] | nPL [kg] | sPL [kg] | nFB [kg] | sFB [kg] | ΔPL [kg] | ΔFB [kg] |
|---|---|---|---|---|---|---|
| 39531 | 4235 | 4489 | 3471 | 3347 | 254 | 124 |
| 44182 | 8466 | 8734 | 3676 | 3545 | 268 | 131 |
| 48832 | 12652 | 12935 | 3903 | 3765 | 283 | 138 |

Fig. 10D

COMPUTER-IMPLEMENTED METHOD AND SYSTEM FOR ESTIMATING IMPACT OF NEW OPERATIONAL CONDITIONS IN A BASELINE AIR TRAFFIC SCENARIO

CROSS-REFERENCE TO RELATED APPLICATIONS

This application claims priority to European Patent Application 15173095.9 filed on Jun. 22, 2015. The aforementioned related patent application is herein incorporated by reference in its entirety.

BACKGROUND

The disclosure generally relates to operational efficiency including airline operational efficiency evaluation. More particularly, the present disclosure relates to a method and system that predicts the impact of possible modifications in a baseline air traffic scenario.

There is no tool available today that accurately and consistently compares the operational efficiency of an actual air traffic scenario with an alternative synthetic scenario ("what-if" scenario).

Therefore, there is a need for a tool that is capable of predicting the impact that modifications in the air traffic context would have on airline operational efficiency.

SUMMARY

The present disclosure refers to a computer-implemented method and system to predict the impact that modifications in the air traffic context would have on airline operational efficiency. The present disclosure describes assessing and comparing efficiency metrics (such as fuel burn, capacity, emissions or noise) in two different scenarios: a baseline air traffic scenario, encompassing the air traffic within an airspace region of interest during a specific time interval, and an alternative or hypothetical "what-if" synthetic scenario, based on the baseline air traffic scenario (same airspace region and time interval) but incorporating specific changes in the air traffic environment. These changes include items such as different Air Traffic Management (ATM) procedures, traffic density, fleet mix or airspace structure. The baseline air traffic scenario normally corresponds to a real air traffic scenario, with actual air traffic data, although the baseline scenario may also correspond to a simulated air traffic scenario with simulated air traffic data. The hypothetical "what-if" scenario can consider alternative trajectories for some or all of the flights considered in the baseline air traffic scenario. The alternative trajectories are defined to represent, for example, a future concept of operations, new procedures or different aircraft types.

The present disclosure accurately estimates the impact that modifications in air traffic operations (such as new operational concepts, procedures, weather or fleet characteristics), would have on airline efficiency before those changes are implemented. The changes may be related, among others, to the introduction of new procedures or new technology for Communications, Navigation or Surveillance (CNS). The main objective is to quantify and understand the impact of changes in the operational environment (e.g., new aircraft fleet or the implementation of new operational procedures) on the efficiency metrics of interest. These metrics of interest include fuel burn and delay.

The present disclosure describes a single trajectory modeling and generation engine to perform the comparative analysis. The model driving the assessment of current air traffic operations is also employed to drive the generation of the synthetic alternative assessments. The level of consistency provided, allows more accurate and consistent comparisons than existing solutions.

The trajectory modeling technology provides a rich set for the characterization of aircraft operations. The employment of this technology enables an accurate estimation of aircraft behavior from surveillance data and renders the specification of the alternative scenarios straightforward. One novel aspect of the disclosure is how the trajectory modeling technology is employed to enable accurate and consistent comparative analysis.

A method of the disclosure first estimates the aircraft behavior of each flight (i.e., flight commands and guidance laws that are controlling the flight) in a real air traffic scenario (the baseline scenario). The estimates are based on their trajectories, which are inferred from recorded surveillance tracks and context data. The inferred aircraft behavior serves to obtain meaningful variables for the efficiency metrics, such as fuel burn, engine rating, speed schedule or aircraft configuration, which are not in the surveillance data. Then, the generation of the alternative scenarios makes use of the same models to build the set of trajectories and aircraft behaviors used in the efficiency metrics evaluation.

Subsequently, the method calculates, using specific efficiency metrics (for instance, fuel burn), the performance of a set of alternative, synthetic aircraft trajectories. These synthetic aircraft trajectories are generated on the basis of the same physical models (same equations of motion and aircraft performance model) used in the inference process above but considering new operational conditions. The new operation conditions may include, for instance, new arrival procedures or different aircraft types. For example, the method allows estimating the change in fuel burn from implementing a new arrival procedure into an airport with respect to the fuel burn in current arrival operations. The results of the metrics in the alternative scenario are then compared to the results obtained in the reference baseline scenario. To ensure that the comparison between the results obtained in the simulated "what-if" scenario and those derived from the surveillance data are meaningful, the same trajectory modelling library is used to reconstruct the trajectories of the baseline scenario and to simulate the alternative trajectories in the "what if" scenario.

In summary, given a set of recorded surveillance tracks from a reference baseline scenario, the disclosure describes identifying and reconstructing the different trajectories flown in that scenario, and inferring the evolution of the aircraft dynamics, including airspeed and mass, from the surveillance data. The trajectory reconstruction process uses a model of the meteorological conditions encountered by the aircraft. Therefore, meteorological forecasts of winds and atmospheric conditions aloft for the geographical area and time interval of interest are typically used. The disclosure also makes use of a consistent set of models based on the Aircraft Intent Description Language (AIDL) and standard aircraft performance models, such as BADA (Base of Aircraft Data).

The present disclosure describes a decision-support tool for airlines, aircraft manufacturers and ANSPs for operations planning decisions. An example of such a tool is analysis of the impact on time, payload capacity and fuel burn of different potential new arrival procedures at a given airport. One advantage of the disclosure is that it can produce results on the basis of surveillance data, without the need for recorded flight data from individual flights. Surveillance data can be collected centrally for all aircraft flying within the airspace of interest rather than gathering flight data from different airlines and aircraft types that could prove costly and cumbersome. The present disclosure provides an airline with insight into the air traffic context within which it flies, including its competitors, and can be used as a "what if" trial planning tool to find opportunities for improved efficiency in a given airspace.

The present disclosure additionally provides assessment of the impact of air traffic changes on the environment and air traffic performance. Environmental impact metrics (e.g. noise, emissions) and air traffic metrics (e.g. traffic density, throughput) are based on trajectory data and therefore can be derived from the trajectories modeled in the present disclosure.

In accordance with one aspect of the present invention there is provided a computer-implemented method for estimating impact of new operational conditions in a baseline air traffic scenario. The method comprises the following steps:

- for at least one flight in a baseline air traffic scenario, inferring an aircraft intent that fits corresponding flight track data;
- computing a reconstructed trajectory of at least one flight in the baseline air traffic scenario using the aircraft intent;
- for at least one flight in an alternative air traffic scenario, generating an aircraft intent that fits new operational conditions;
- computing a generated trajectory of at least one flight in the alternative air traffic scenario using the aircraft intent;
- computing trajectory-based analytics on each computed trajectory of the baseline and alternative air traffic scenarios using a set of metrics.

The method may comprise the step of retrieving recorded flight track data and associated aircraft type information of at least one flight in the baseline air traffic scenario. The method may also comprise the step of generating an alternative air traffic scenario based on the baseline air traffic scenario with new operational conditions.

In another embodiment the computation of a reconstructed trajectory is performed for each flight in the baseline air traffic scenario, and the computation of a generated trajectory is carried out for each flight in the alternative air traffic scenario.

In yet another embodiment the method comprises the following steps:

- retrieving recorded flight track data and associated aircraft type information of at least one flight in a baseline air traffic scenario;
- for each flight in the baseline air traffic scenario, inferring an aircraft intent that fits the flight track data;
- computing the trajectory of each flight in the baseline air traffic scenario using the aircraft intent, obtaining a reconstructed trajectory with a sequence of aircraft states;
- generating an alternative air traffic scenario based on the baseline air traffic scenario with new operational conditions;
- for each flight in the alternative air traffic scenario, generating an aircraft intent that fits the new operational conditions of the flight;
- computing the trajectory of each flight in the alternative air traffic scenario using the aircraft intent, obtaining a generated trajectory with a sequence of aircraft states;
- computing a trajectory-based analytics on each reconstructed trajectory of the baseline air traffic scenario using a set of metrics; and
- computing a trajectory-based analytics on each generated trajectory of the alternative air traffic scenario using the same set of metrics.

The flight track data may be data recorded in a real air traffic scenario or data obtained in a simulator. The aircraft intent is preferably expressed in AIDL.

The step of inferring the aircraft intent preferably comprises obtaining an airspeed of the aircraft using a characterization of weather and atmospheric conditions for a geographical area and time interval corresponding to the flight track data.

The step of computing the trajectory may comprise the use of aircraft performance data of the aircraft types involved and/or the use of weather forecasts for the geographical area and time interval of interest. The method may also comprise a post-processing step of the flight track data to improve quality of the data.

The trajectory computation step may comprise obtaining a sequence of aircraft states including, among others, the position, altitude, airspeed and instantaneous aircraft mass. The instantaneous aircraft mass is preferably estimated based on the aircraft intent and by setting the total aircraft weight at some point of the flight to a given value.

The new operational conditions established in the alternative air traffic scenario may comprise any of the following conditions, or a combination thereof: new air traffic operations, new flight procedures, new ATM procedures, different traffic density, different aircraft types, different airspace set ups, different weather conditions, and/or different initial conditions.

The set of metrics may include any of the following, or a combination thereof: aircraft payload capacity; aircraft fuel efficiency; aircraft throughput; flight time efficiency; flight cost efficiency; air traffic metrics; environmental impact metrics, such as noise or emissions.

The method may also comprise comparing the trajectory-based analytics of the baseline air traffic scenario with the trajectory-based analytics of the alternative air traffic scenario.

In accordance with a further aspect of the present invention there is provided a computer system for estimating impact of new operational conditions in a baseline air traffic scenario. The system comprises:

- an intent inference module for inferring an aircraft intent that fits corresponding flight track data for at least one flight in a baseline air traffic scenario;
- an intent generation module for generating an aircraft intent that fits new operational conditions for at least one flight in an alternative air traffic scenario;
- a trajectory computation module for computing the trajectory of at least one flight in the baseline air traffic scenario and at least one flight in the alternative air traffic scenario using the corresponding aircraft intent;
- an evaluation module for computing trajectory-based analytics on each computed trajectory of the baseline and alternative air traffic scenario using a set of metrics.

The intent inference module may also be configured for retrieving flight track data and associated aircraft type information of at least one flight in the baseline air traffic scenario.

In another embodiment the trajectory computation module is configured for computing the trajectory of each flight in the baseline and alternative air traffic scenarios using the corresponding aircraft intent.

In yet another embodiment the system comprises:

an intent inference module for retrieving flight track data and associated aircraft type information of at least one flight in a baseline air traffic scenario, and inferring for each flight an aircraft intent that fits the flight track data;

an intent generation module for, using an alternative air traffic scenario based on the baseline air traffic scenario with new operational conditions, generating an aircraft intent for each flight in the alternative air traffic scenario that fits the new operational conditions of the flight;

a trajectory computation module for computing the trajectory of each flight in the baseline air traffic scenario and in the alternative air traffic scenario using the corresponding aircraft intent;

an evaluation module for computing a trajectory-based analytics on each computed trajectory of the baseline and alternative air traffic scenario using a set of metrics.

The evaluation module may be also configured for comparing the trajectory-based analytics of the baseline air traffic scenario with the trajectory-based analytics of the alternative air traffic scenario.

In accordance with yet a further aspect of the present invention there is provided a computer program product for estimating impact of new operational conditions in a baseline air traffic scenario, comprising computer code instructions that, when executed by a processor, causes the processor to perform the previous method. The computer program product preferably comprises at least one computer-readable storage medium having recorded thereon the computer code instructions.

The features, functions, and advantages that have been discussed can be achieved independently in various embodiments or may be combined in yet other embodiments further details of which can be seen with reference to the following description and drawings.

BRIEF DESCRIPTION OF ILLUSTRATIONS

A series of drawings which aid in better understanding the invention and which are expressly related with an embodiment of said invention, presented as a non-limiting example thereof, are very briefly described below.

FIG. 1 shows a system for estimating the impact of new operational conditions in a baseline air traffic scenario according to the present invention.

FIG. 2 schematically depicts the aircraft intent inference and trajectory reconstruction process according to an embodiment.

FIG. 3 shows the process of FIG. 2 in more detail.

FIG. 4 schematically depicts the aircraft intent generation and trajectory synthesis process according to an embodiment.

FIGS. 10A, 10B, 10C and 10D shows the analysis results for each of the target flights of FIG. 7.

DETAILED DESCRIPTION

Figure 1:
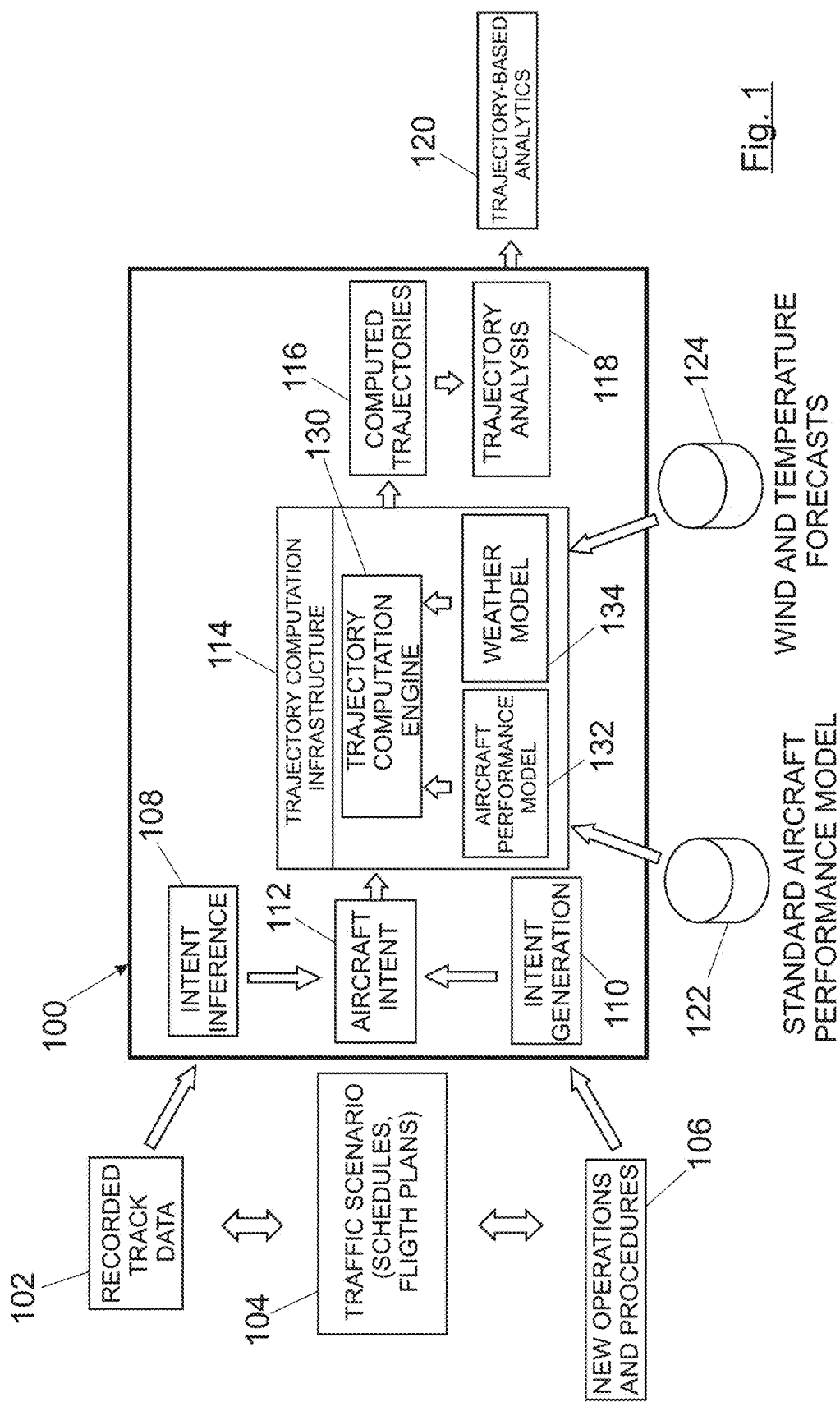

A system 100 for estimating the impact of new operational conditions in a baseline air traffic scenario is shown in FIG. 1. The system comprises an intent inference module 108 and an intent generation module 110 for respectively inferring and generating an aircraft intent 112, a trajectory computation engine 114 with a trajectory computation module 130 for obtaining a computed trajectory 116 for each flight, and an evaluation module 118 for comparing the computed trajectories 116 of the flights in different scenarios according to a set of metrics, obtaining trajectory-based analytics 120.

The input data of the system 100 includes flight track data 102 and new operational conditions 106. The flight track data 102 normally includes, at least, a set of longitudes, latitudes, altitudes and time stamps for different positions of the aircraft. Any input data can be complemented by additional information regarding the traffic scenario, such as schedules or flight plans, including aircraft type information 104 of each flight. Flight track data 102 of a flight includes position records including latitude, longitude, barometric altitude, and other reference information. Flight plans include information on lateral route, flight level, waypoint flyover times and other reference information. The system 100 also makes use of information retrieved from external modules, such as an aircraft database 122 and a weather database 124, from which the trajectory computation engine 114 obtains aircraft performance data 132 of each aircraft type and a characterization of the weather and atmospheric conditions 134 for the geographical area and time interval of the flights. In an embodiment, BADA (Base of Aircraft Data) is used as aircraft database 122 and weather information 124 is retrieved from the National Oceanic and Atmospheric Administration (NOAA). Additionally, NOAA's Global Forecast System (GFS) models are employed for weather information 124.

The system 100 assesses the potential impact of new air traffic management operations and procedures on a set of metrics characterizing the performance of current operations. The system 100 executes three main processes:

1. Aircraft intent inference and trajectory reconstruction 200 for reconstructing a trajectory 116a in a baseline air traffic scenario.
2. Aircraft intent generation and trajectory synthesis 300 for generating a trajectory 116b in an alternative air traffic scenario.
3. Computation and comparison of flights performance in the baseline air traffic scenario with the alternative air traffic scenario using determined metrics.

Figure 2:
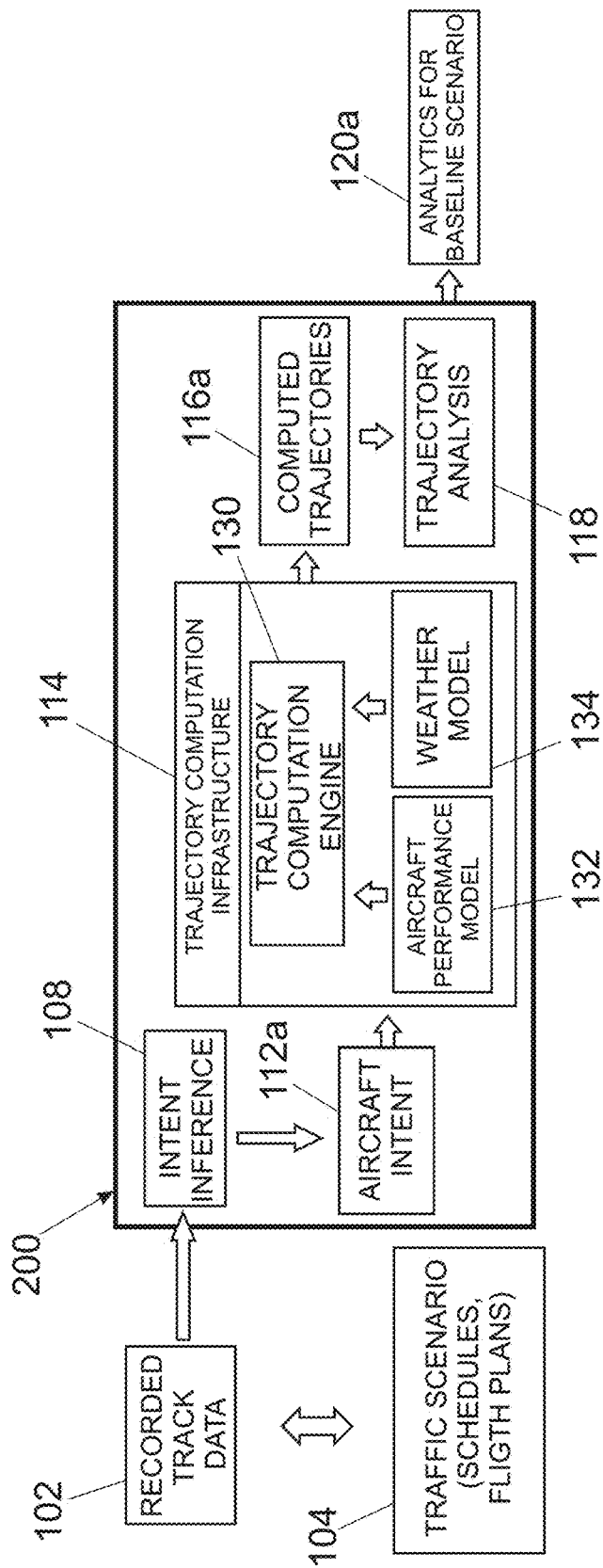

FIG. 2 schematically depicts the modules and input data used in the first main process, the aircraft intent inference and trajectory reconstruction 200. The input to this process is a set of flights with associated surveillance tracks or flight track data 102 in a baseline air traffic scenario, and aircraft type information 104 obtained from a traffic scenario, for example, from flight plans. The objective of the first main process is to reconstruct, for each of the flights, the evolution of the aircraft state (mainly, speed and mass) from the surveillance data. To that aim, an instance of aircraft intent 112a that fits the flight track data is inferred using the intent inference module 108. The resulting aircraft intent expressed in AIDL is then fed to the trajectory computation module 130, which integrates the full trajectory and obtains the reconstructed trajectory 116a with a sequence of aircraft states, including position, altitude, airspeed and instantaneous aircraft mass, from an initial state to a final state (e.g. from take-off to landing).

Figure 3:
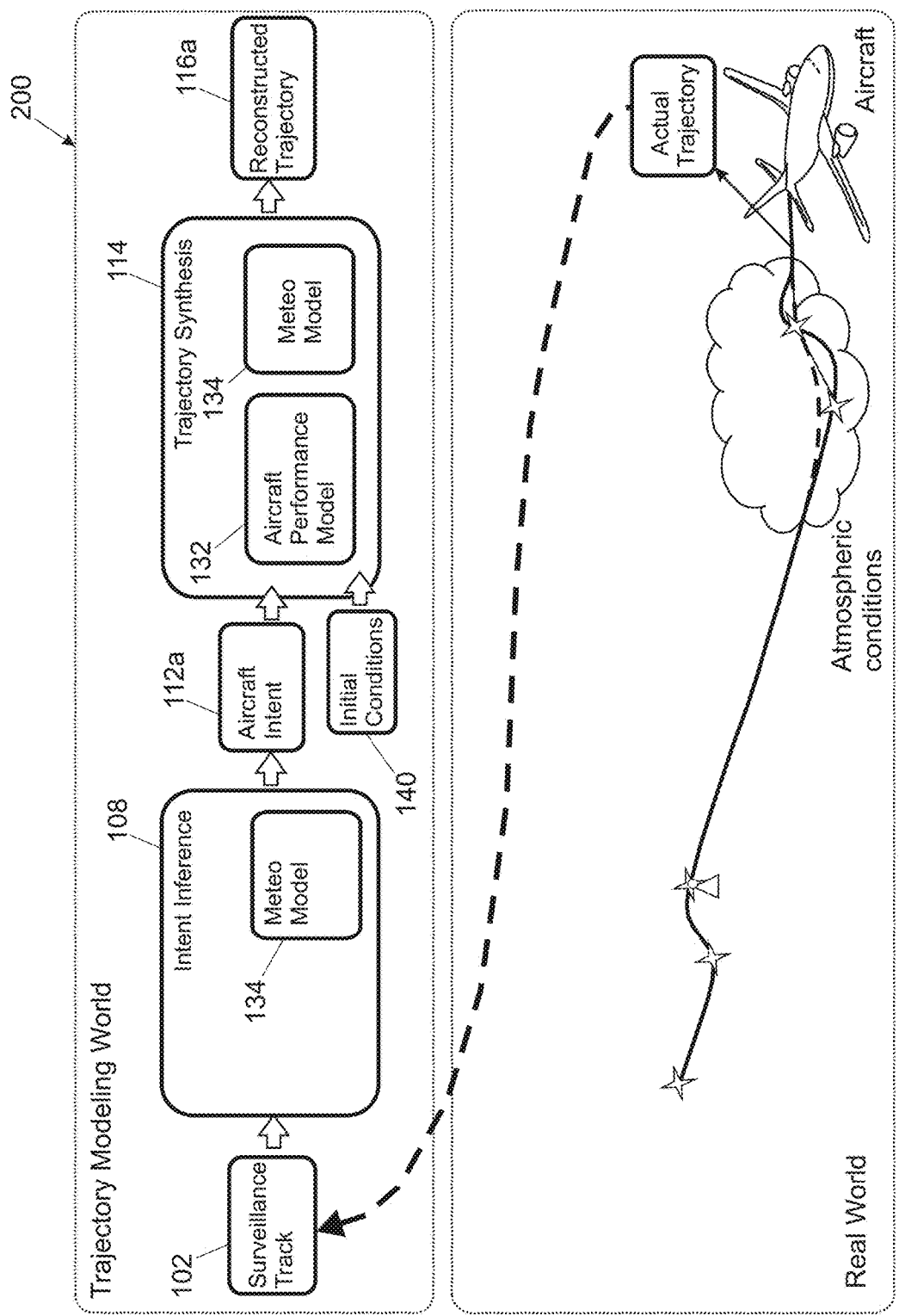

The aircraft intent inference and trajectory reconstruction 200 is described in more detail in FIG. 3. This first main process 200 includes:

For each flight, an instance of aircraft intent 112a that fits the surveillance tracks 102 of that flight is built. The aircraft intent 112a is preferably expressed in AIDL (Aircraft Intent Description Language), although other languages that unambiguously describe aircraft intent can be used. This AIDL instance includes a lateral thread, which comprises a sequence of geometric constructs (segments of geodesics and circular arcs) that match the horizontal projection of the surveillance reports (latitude and longitude coordinates), two vertical threads, which comprise sequences of kinematic instructions (altitude and airspeed) that match the sequence of the aircraft altitudes and aircraft airspeeds, and three configuration threads reflecting the position of the high lift devices (i.e., flaps and slats), landing gear and speed brakes. To obtain the airspeed of the aircraft form the flight track data 102, a characterization of the weather and atmospheric conditions 134 faced by the aircraft (which can for instance be retrieved from a weather database 124 or obtained from a simulator) is employed, such as the NOAA's GFS (Global Forecasting System) Atmospheric Model including the meteorological forecasts for the time interval in question to derive airspeeds from ground speeds. The ground speeds are obtained as derivatives of the sequence of time stamped positions.

Aircraft mass can be estimated based on the aircraft intent 112a and by setting the total aircraft weight at some point of the flight to a given value. If no actual weight information is available, total aircraft weight may be assumed for some point of the flight, typically at take-off or landing (e.g. landing weight equal to 120% of the Operating Empty Weight (OEW) of the aircraft type in question).

The aircraft intent 112a is fed to the trajectory computation engine 114 together with a set of initial conditions 140 (aircraft state variables, such as position, time altitude, mass or speed). To integrate the aircraft trajectory, the trajectory computation engine 114 uses aircraft performance data 132 retrieved from aircraft database 122, such as BADA (Base of Aircraft Data) 3.10, and a characterization of the weather and atmospheric conditions 134 faced by the aircraft and retrieved from weather database 124, such as the GFS Atmospheric Model, with the meteorological forecast conditions encountered by the aircraft during the flight.

Details about the process of inferring the trajectory of each flight in the baseline scenario, including the initial aircraft mass, can be found in patent document EP2685440-A1, in the name of The Boeing Company and which is herewith incorporated by reference, describing in detail the inference of aircraft intent using aircraft trajectory data.

Depending on the quality of the data source, the surveillance tracks 102 used as input for this process may require some post-processing to perform validation, track indexing, outlier removal, smoothing, flight plan matching, etc.

Figure 4:
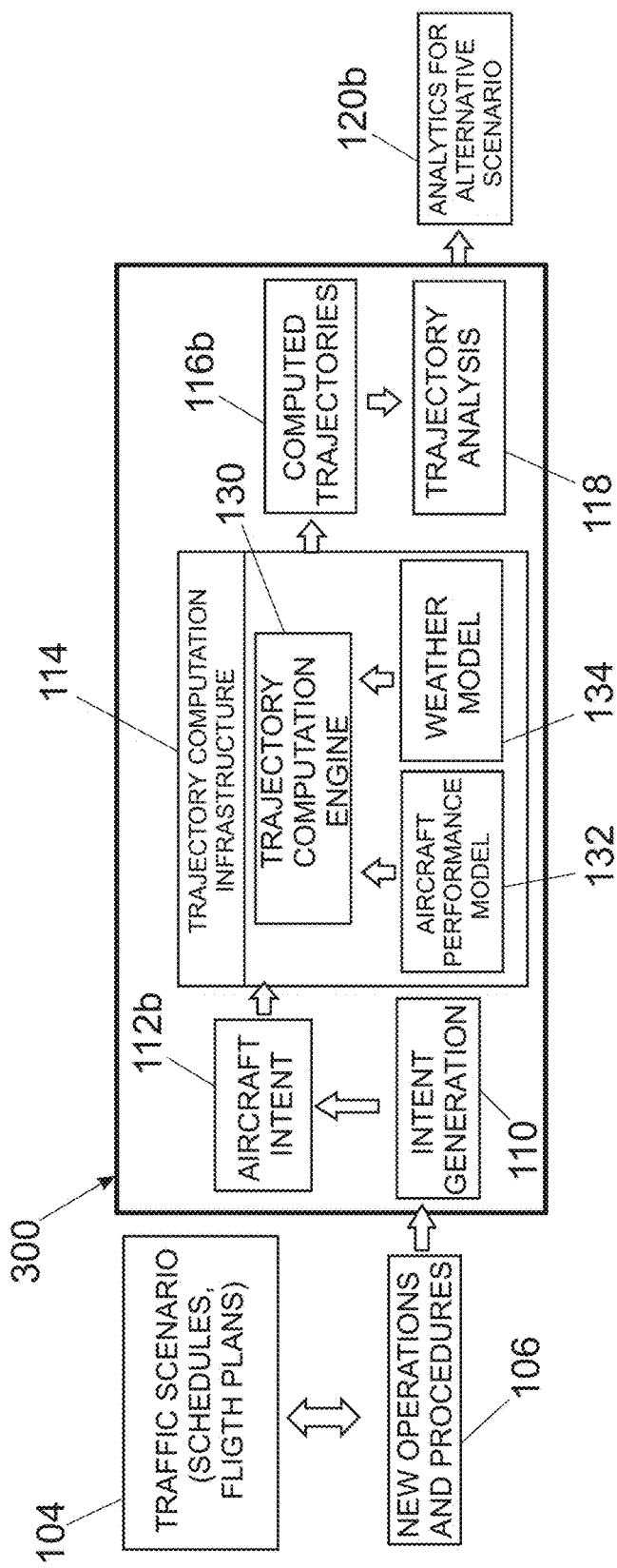
Figure 5:
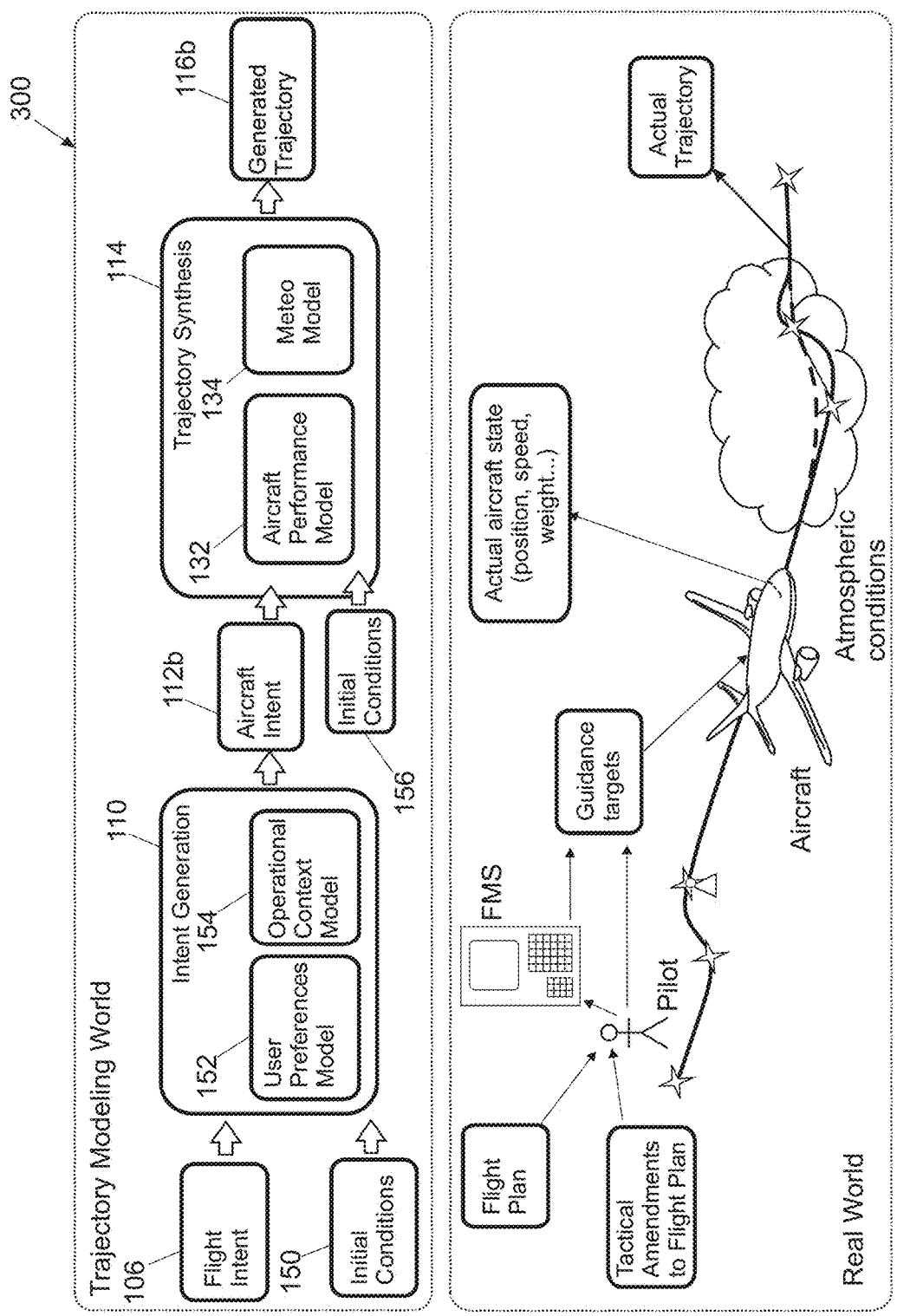
FIG. 5 shows the process of FIG. 4 in more detail.

FIG. 4 schematically depicts the modules and input data used in the second main process, the aircraft intent generation and trajectory synthesis 300. FIG. 5 describes in more detail this second main process 300. The input to this process is a set of flight plans 106 with associated initial conditions 150, which are the aircraft state variables (e.g., altitude, speed, position, time, etc.) at the point where the flight plan is active. The flight plans 106 correspond to an alternative air traffic scenario based on the baseline air traffic scenario of the first main process but with new operational conditions. The objective of the second main process 300 is to generate the aircraft intent 112b associated to these flight plans and build the corresponding trajectory 116b from that aircraft intent 112b, which is in turn associated to the specific flight plan 106. To that aim, an instance of aircraft intent 112b that fits all the restrictions associated to the flight plan and the operational context using the intent generation module 110, wherein the user preferences and operational context are defined, respectively, in a user preferences model 152 and an operation context model 154. The aircraft intent 112b, preferably expressed in AIDL, is then fed to the trajectory computation module 114, which integrates the full trajectory and obtains a sequence of aircraft states, including position, altitude, airspeed and instantaneous aircraft mass. This second main process 300 includes:

For each flight plan 106 associated to each flight, build an instance of aircraft intent 112b expressed in AIDL (Aircraft Intent Description Language) that complies with the route and restrictions included in the flight plan 106. In addition, this AIDL instance will have to comply with all the constraints and procedures included in the operational context where the flight plan is active. The initial conditions 150 can be extracted, for instance, from the radar track analysis, a trajectory reconstruction up to a specific point in a trajectory or provided manually as an input.

The resulting aircraft intent 112b is fed to the trajectory computation engine 114 together with a set of initial conditions 156 (e.g. time, mass, position, altitude and speed). This set of initial conditions 156 may correspond to the initial conditions 150 of the input data and further includes the initial mass of the aircraft. To integrate the aircraft's trajectory, the trajectory computation engine 114 uses aircraft performance data 132 (e.g. BADA 3.10) and a characterization of the weather and atmospheric conditions 134 (e.g. the GFS Atmospheric Model) that the flight would face during the flight in the alternative air traffic scenario.

Alternative scenarios can be tested by changing the different input data that feed the intent generation module 110. For instance, different airspace set ups can be tested by changing the operational context data. Additionally, weather conditions can be changed to study its impact on input traffic data. Further, different starting conditions for the traffic can be explored by changing the initial conditions. Also, different aircraft types can be tested to check the impact of a new aircraft fleet.

The third main process includes the computation of trajectory-based analytics (120a, 120b) on each computed trajectory (116a, 116b) of the baseline and alternative air traffic scenarios using a set of metrics. The trajectory-based analytics (120a, 120b) are then compared to evaluate the impact of the new operational conditions established in the alternative air traffic scenario. Different set of metrics can be used to obtain the trajectory-based analytics (120a, 120b), such as payload capacity, fuel burn, time delay or environmental impact (noise, emissions).

Figure 6:
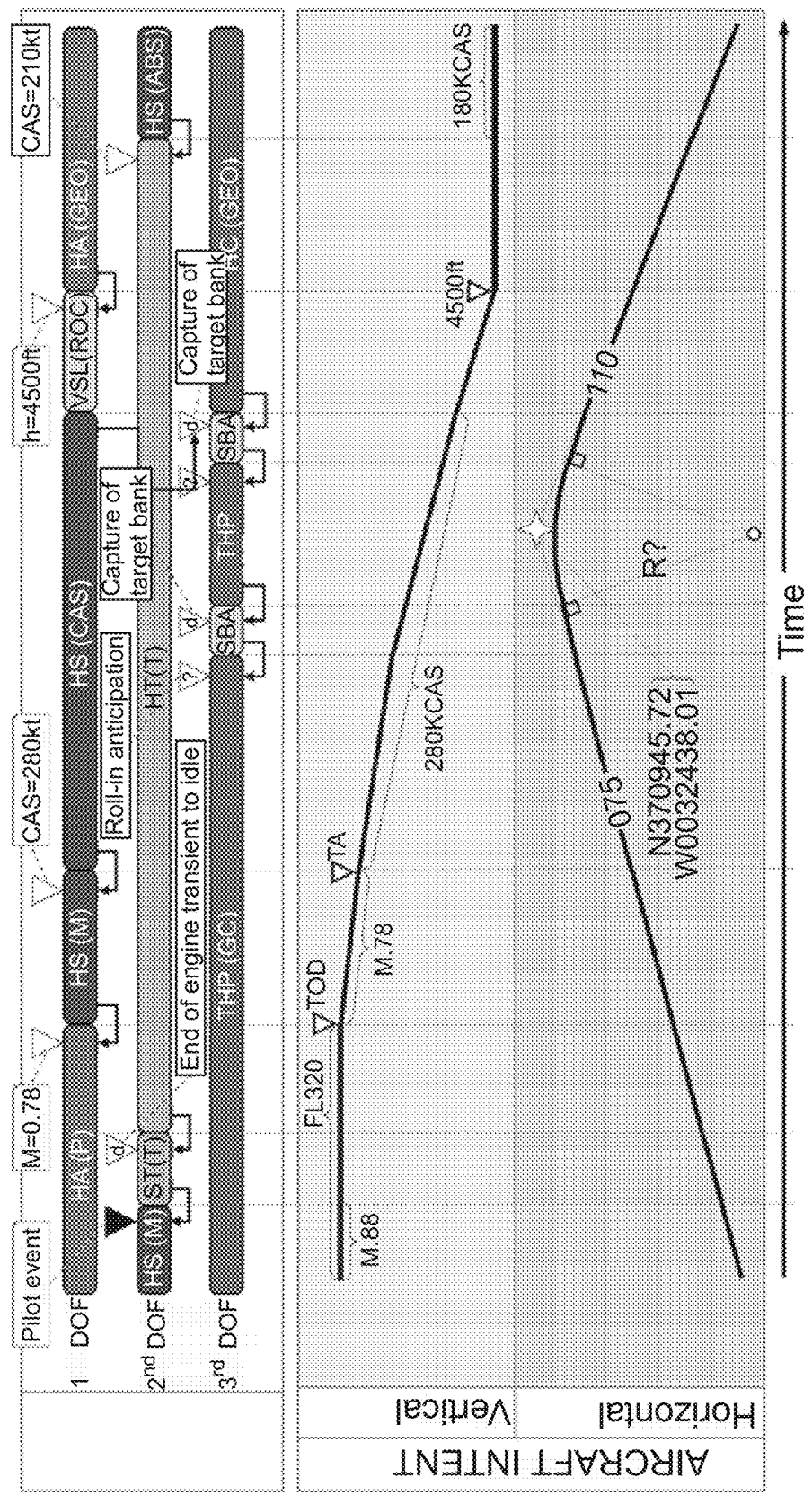
FIG. 6 shows an example of an aircraft intent expressed in Aircraft Intent Description Language (AIDL).

As explained before, the aircraft intent (112a, 112b) is preferably expressed in Aircraft Intent Description Language (AIDL). AIDL is a formal language that unambiguously describes aircraft intent. AIDL includes all allowable guidance modes and rules governing how to combine them so that the resulting trajectory is flyable. An AIDL instance is represented in FIG. 6, as an example. AIDL comprises an alphabet and a grammar:

Alphabet: The "letters" of the alphabet are called instructions. An instruction represents a guidance target to be tracked during a certain time interval, closing a degree-of-freedom (DOF) during that time. An instruction comprises an effect (mathematical equation to be satisfied simultaneously with the equations of motion), and a trigger (e.g. a switching condition for the next instruction).

Grammar: The grammar provides rules to ensure that all DOFs are well-defined at all times. Lexical Rules govern the definition of operations, which are sets of compatible instructions that, when simultaneously active, univocally determine the aircraft motion. Syntactical Rules govern the concatenation of successive operations.

Figure 7:
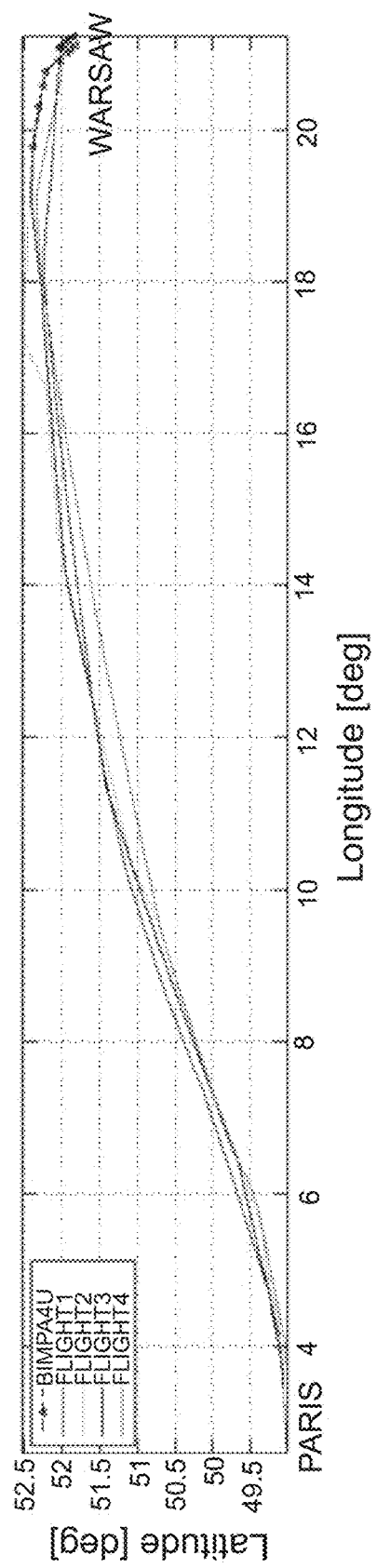
FIG. 7 depicts a general overview of the flight tracks of a set of four target flights and a nominal flight covering the route Paris-Warsaw.
Figure 8:
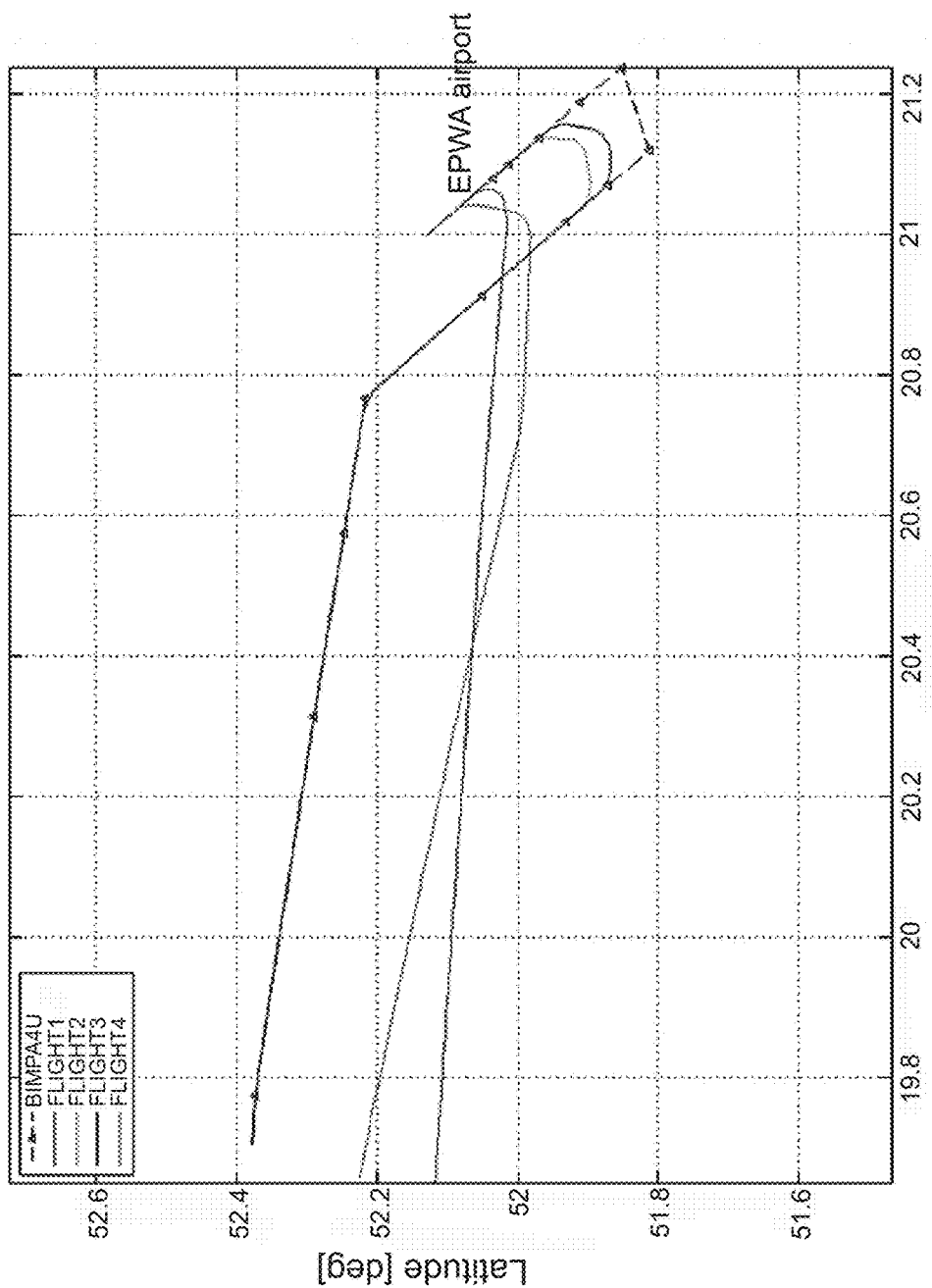
FIG. 8 illustrates a detail of the arrival of the target flights of FIG. 7 into EPWA airport.

A detailed example of application for the system and method of the present invention will be discussed in FIGS. 7 to 10. This example relates to the analysis of the impact on operational efficiency of shortened flights. FIG. 7 represents a general overview of the flight tracks (longitude and latitude) of a set of target flights (FLIGHT 1, FLIGHT 2, FLIGHT 3, FLIGHT 4) and a nominal flight (BIMPA4U) covering the route Paris-Warsaw. FIG. 8 depicts details of the arrival of these flights into Warsaw Chopin Airport (EPWA) airport, the target flights (FLIGHT 1, FLIGHT 2, FLIGHT 3, FLIGHT 4) using a shortened arrival procedure at this airport and the nominal flight (BIMPA4U) using the original or nominal arrival procedure. Particularly, the example analyzes the potential benefits of shortening arrival procedures at EPWA airport, focusing on short-term benefits based on reduction of discretionary fuel reserves. The focus of the analysis is a set of flights covering the route Paris-Warsaw (LFPG-EPWA). The application of the system and method of the present invention revealed that flights on this route are very much affected by both shortcuts to the scheduled arrival procedure and operational restrictions to the allowable payload. The numerical results showed in FIGS. 10A-10D correspond to an Embraer ERJ190 aircraft type. The combination of a regularly shortened route with uniform aircraft equipment and scheduled arrival procedure makes the case particularly interesting.

Based on the above considerations, the quantitative assessment is focused on Paris-Warsaw flights (FLIGHT 1, FLIGHT 2, FLIGHT 3, FLIGHT 4) that operated during a specific time window and whose flight track data 102 significantly shortcuts current arrival procedures, in comparison with the nominal arrival procedure (BIMPA4U). For each of the target flight (FLIGHT 1, FLIGHT 2, FLIGHT 3, FLIGHT 4), the system outputs a pair of trajectories describing the evolution of the aircraft states from take-off to landing, one for a flight that follows the original (i.e. nominal) route and the other for a flight that follows a shortened version of the nominal route. Fuel efficiency and payload capacity for both routes are then compared.

An important aspect of the analysis is related to take-off and landing weights, actual payload and fuel policy. The data available for the example did not contain such information. The only information available was related to the reference weights of the aircraft type, that is, maximum take-off weight (MTOW), maximum payload (MPL) and operating empty weight (OEW). These are part of the aircraft performance model employed for the example (BADA 3.10). In order to deal with this uncertainty, the example set a feasible take-off weight based on the assumption that flights operate on a 5% trip fuel reserves policy. A feasible take-off weight is one that is both lower than MTOW and such that the corresponding landing weight is greater than OEW.

For each of the target flights (FLIGHT 1, FLIGHT 2, FLIGHT 3, FLIGHT 4), the example undertook a three-step process:

The first step was an aircraft intent inference and trajectory reconstruction 200 for the target flight. In this step and for this example, the flight track data is combined with meteorological data from NOAA's GFS models as previously described. The objective is to extract a feasible take-off weight, climb and descent speeds, cruise conditions (i.e. altitude and Mach number), and a characterization of the lateral path actually flown. This information is then employed in the following two steps to generate the trajectory pairs. Landing weight (LW) is set to be the addition of the operating empty weight of the aircraft type (OEW), the maximum payload of the aircraft type (MPL), and 10% of the remainder to maximum landing weight of the aircraft type (MTOW); that is, $LW=OEW+MPL+0.1*(MTOW-OEW-MPL)$. Note that the choice of landing weight is based on the considerations previously described and with the only goal of finding a feasible take-off weight.

The second step consists in the generation of the trajectory for the flight that follows the original (i.e. nominal) route (BIMPA4U). In this step the lateral route is set up by merging the actual flight track data with the nominal arrival procedure. For this purpose, the lateral path characterization from the first step is cropped at the stage where the flight track diverges from the nominal arrival procedure. Thereafter, the path characterization is merged to the route description of the nominal arrival procedure. The resulting lateral path characterization, together with all the other operational specifications from the first step (take-off weight, climb and descent speeds and cruise Mach conditions), and the meteorological model used in the first step, are employed to generate the resulting trajectory.

The third step consists in the generation of the trajectory for the flight that follows a new shorter route (based on actual shortcuts cleared by Air Traffic Control, ATC). In this step, all the operational specifications from the first step, including the complete lateral path characterization, and the meteorological model used in the first step, are employed to obtain the resulting trajectory.

The second and third steps were repeated with various take-off weights so as to test the sensitivity of the analysis to take-off weight. For this purpose, a set of multiplicative factors (namely 0.8, 0.95 and 1.05) were applied to the take-off weight from the first step.

Regarding the flights and associated data used for the example, the example scenario was set up using a set of collected ADS-B (Automatic Dependent Surveillance-Broadcast) reports. The reports were then processed so as to retain only the flight tracks corresponding to the targeted flights from Paris to Warsaw. The selected flight tracks were then analyzed so as to retain only flights satisfying the following criteria:

Flight track data covers the whole flight from take-off to landing.

Flight track does not have large gaps of missing data.

Flight track effectively corresponds to a flight that executed a shortened route.

Flight track corresponds to a flight following a BIMPA procedure towards runway 33.

The application of this criteria resulted in flight tracks for the four flights (FLIGHT 1, FLIGHT 2, FLIGHT 3, FLIGHT 4) shown in FIG. 7, depicting a general overview of the flight tracks for the four target flights and the nominal route (BIMPA4U). FIG. 8 shows the nominal arrival procedure (BIMPA4U) that starts at waypoint BIMPA and goes towards runway 33 and the arrival procedures for all four target flights (FLIGHT 1, FLIGHT 2, FLIGHT 3, FLIGHT 4). The flight tracks show that all four target flights (FLIGHT1, FLIGHT2, FLIGHT3, FLIGHT4) have the nominal route shortened to different degrees. It can be seen that FLIGHT1 is the flight that has the arrival procedure shortened the most, followed by FLIGHT4, FLIGHT2 and FLIGHT3. The example considers each individual track as the definition of a separate and shortened arrival procedure for the specific flight and compares the fuel burn and payload capacity that it would have attained if it had executed the nominal route BIMPA4U with no shortcuts. It is therefore expected that each flight will have different comparative fuel burn and payload capacity results given the differences in the various shortened versions of the nominal procedure. The estimate of the fuel burn during the segment of trajectory considered is calculated from the computed trajectory as the difference between the initial mass and the landing mass.

Figure 9:
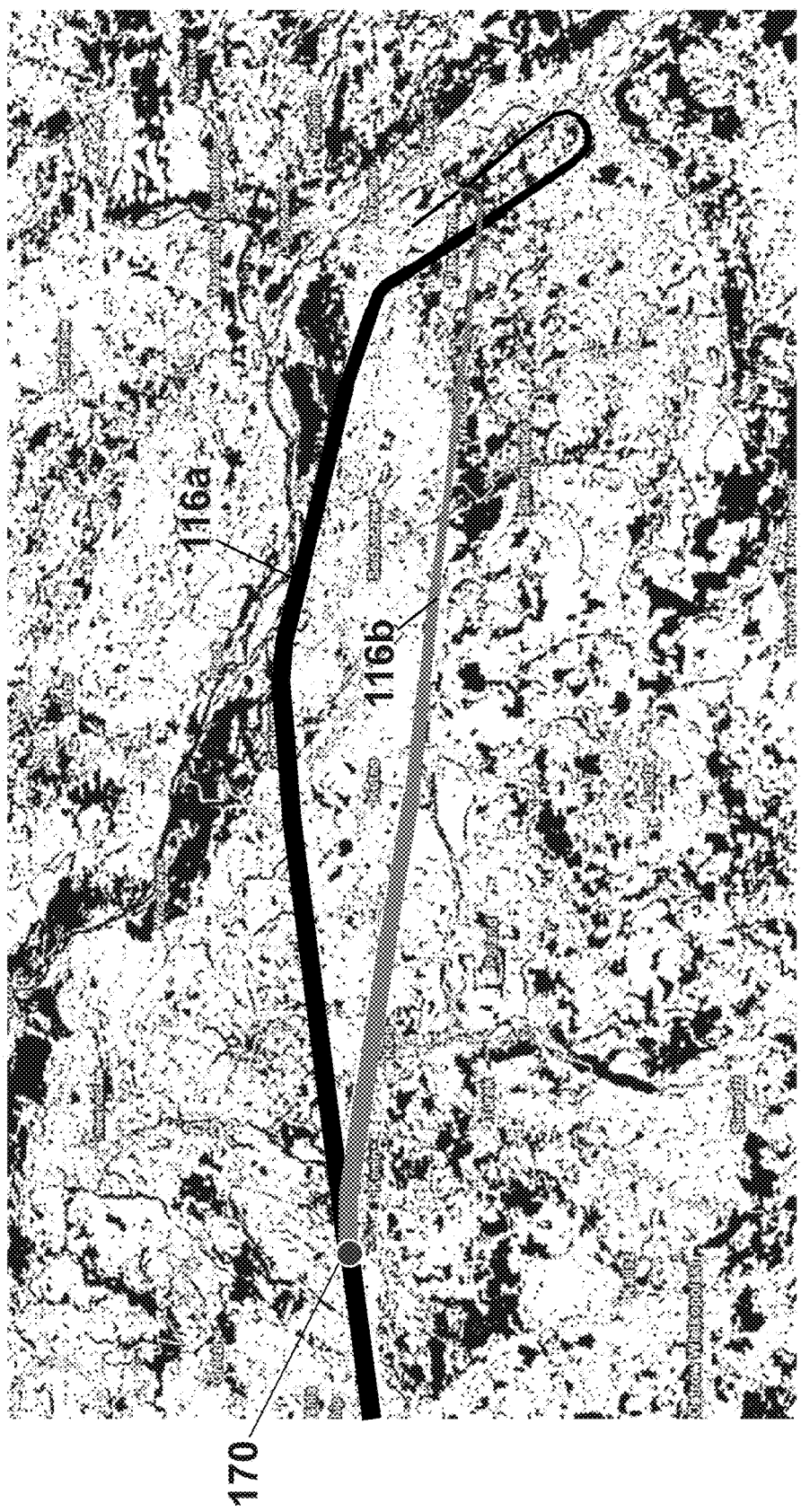
FIG. 9 shows an example of actual and alternative flights for a target flight of FIG. 7.

The system generates pairs of trajectories that correspond to a flight that follows the nominal route and the shortened route. In this particular case the shortened route corresponds to a baseline air traffic scenario (a real air traffic scenario with actual flight track data), whereas the nominal route corresponds to an alternative scenario. Each pair of trajectories is flown according to operational specifications estimated from the actual conditions seen by the target flights. The only assumption on the operational conditions is on take-off weight. FIG. 9 illustrates a generation of a pair of such computed trajectories (116a, 116b) from the point 170 where they diverge onwards.

The results presented correspond to the application of the three-step process to the four target flights. In particular, each target flight has second and third steps repeated for three different take-off weights, each run corresponding to the application of factors 0.8, 0.95 and 1.05 to the reference take-off weight from the first step. Thus, each target flight has three pairs of trajectories generated, each pair with a different take-off weight. In addition to fuel burn, payload capacity is compared by assuming a 5% trip reserve fuel policy in combination with reference weights of the aircraft type, namely operating empty weight (OEW). The tables shown in FIG. 10A (FLIGHT1), FIG. 10B (FLIGHT2), FIG. 10C (FLIGHT3) and FIG. 10D (FLIGHT4) summarize the comparative example for each of the target flights. The following notation is used in the tables:

TOW: take-off weight.
nPL: payload capacity of the flight following the nominal route.
sPL: payload capacity of the flight following the shortened route.
nFB: fuel burn of the flight following the nominal route.
sFB: fuel burn of the flight following the shortened route.
ΔPL: payload capacity increase for the flight following the shortened route.
ΔFB: fuel burn decrease for the flight following the shortened route.

The analysis shows that all the flights experience an increase in payload capacity and a reduction in fuel burn when flying a shortened version of the nominal route. The level of improvement in both payload and fuel burn depend on the degree by which the original arrival procedure is shortened. It is noted that there is roughly a factor of two between the reduction in fuel burn and the increase in payload capacity, that is, for each kilogram of fuel burn reduction there are roughly two kilograms of additional payload capacity. The example shows that there is a potential fuel burn savings of 140 kg, which assuming the same fuel policy would allow for approximately 280 kg of additional payload for the same take-off weight.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects may take the form of an entirely hardware aspect, an entirely software aspect (including firmware, resident software, micro-code, etc.) or an aspect combining software and hardware aspects that may all generally be referred to herein as a "circuit," "module" or "system."

The aspects described herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. For example, a user may access applications (e.g., components of system 100) or related data available in the cloud. Doing so allows a user to access this information from any computing system attached to a network connected to the cloud (e.g., the Internet).

While the foregoing is directed to aspects of the present invention, other and further aspects of the invention may be devised without departing from the basic scope thereof, and the scope thereof is determined by the claims that follow.

What is claimed is:

1. A computer-implemented method for estimating impact of new operational conditions in a baseline air traffic scenario, comprising:
for at least one flight in a baseline air traffic scenario, inferring an aircraft intent that fits corresponding flight track data, wherein the baseline air traffic scenario corresponds to a real air traffic scenario;
receiving aircraft data relating to an aircraft operating the at least one flight in the baseline air traffic scenario;
receiving weather data relating to weather and atmospheric conditions for the at least one flight in the baseline air traffic scenario;

computing a reconstructed trajectory of the at least one flight in the baseline air traffic scenario, based on the aircraft data, the weather data and the inferred aircraft intent;

for at least one flight in an alternative air traffic scenario, generating an aircraft intent that fits new operational conditions to be applied to a plurality of aircraft, wherein the new operational conditions comprise one or more new air traffic management operations and one or more new air traffic procedures, and wherein the generated aircraft intent conforms to the one or more new air traffic management operations and the one or more new air traffic procedures;

computing a generated trajectory of the at least one flight in the alternative air traffic scenario using the generated aircraft intent; and computing trajectory-based analytics on each computed trajectory of the baseline and alternative air traffic scenarios using a set of metrics.

2. The method of claim 1, wherein the flight track data are data recorded in a real air traffic scenario.

3. The method of claim 2, wherein the inferring the aircraft intent comprises obtaining an airspeed of the aircraft using a characterization of weather and atmospheric conditions for a geographical area and time interval corresponding to the flight track data.

4. The method of claim 2, wherein the trajectory computation comprises obtaining a sequence of aircraft states including an instantaneous aircraft mass estimated based on the aircraft intent and by setting the total aircraft weight at some point of the flight to a given value.

5. The method of claim 1, wherein the flight track data are data obtained in a simulator.

6. The method of claim 5, wherein the inferring the aircraft intent comprises obtaining an airspeed of the aircraft using a characterization of weather and atmospheric conditions for a geographical area and time interval corresponding to the flight track data.

7. The method claim 6, further comprising a post-processing step of the flight track data to improve quality of the data.

8. The method of claim 1, wherein the aircraft intent is expressed in AIDL.

9. The method of claim 1, wherein the inferring the aircraft intent comprises obtaining an airspeed of the aircraft using a characterization of weather and atmospheric conditions for a geographical area and time interval corresponding to the flight track data.

10. The method of claim 9, wherein the trajectory computation comprises obtaining a sequence of aircraft states including an instantaneous aircraft mass estimated based on the aircraft intent and by setting the total aircraft weight at some point of the flight to a given value.

11. The method of claim 1, wherein the trajectory computation comprises obtaining a sequence of aircraft states including an instantaneous aircraft mass estimated based on the aircraft intent and by setting the total aircraft weight at some point of the flight to a given value.

12. The method of claim 1, wherein the new operational conditions established in the alternative air traffic scenario comprises any of the following, or a combination thereof:
new air traffic operations,
new flight procedures,
new ATM procedures,
different traffic density,
different aircraft types,
different airspace set ups,
different weather conditions, and
different initial conditions, and
wherein the set of metrics includes any of the following, or a combination thereof:
aircraft payload capacity;
aircraft fuel efficiency;
aircraft throughput;
flight time efficiency;
flight cost efficiency;
air traffic metrics; and
environmental impact metrics.

13. The method of claim 1, further comprising comparing the trajectory-based analytics of the baseline air traffic scenario with the trajectory-based analytics of the alternative air traffic scenario.

14. A computer program product for estimating impact of new operational conditions in a baseline air traffic scenario, comprising computer code instructions that, when executed by a processor, causes the processor to perform the method of claim 1.

15. The method of claim 1, wherein the flight track data is gathered through surveillance of real air traffic.

16. The method of claim 1, wherein inferring the aircraft intent that fits corresponding flight track data further comprises:
generating a description of the aircraft intent, the description expressed using a pre-defined description language.

17. The method of claim 16, wherein the generated description of the aircraft intent comprises at least one of: a lateral thread relating to a horizontal projection of the flight track data, and a vertical thread relating to a sequence of aircraft altitudes and airspeeds.

18. A computer system, comprising:
one or more computer processors; and
a memory containing computer program code that, when executed by operation of the one or more computer processors, performs an operation for estimating impact of new operational conditions in a baseline air traffic scenario, the operation comprising:
for at least one flight in a baseline air traffic scenario, inferring an aircraft intent that fits corresponding flight track data, wherein the baseline air traffic scenario corresponds to a real air traffic scenario;
receiving aircraft data relating to an aircraft operating the at least one flight in the baseline air traffic scenario;
receiving weather data relating to weather and atmospheric conditions for the at least one flight in the baseline air traffic scenario;
computing a reconstructed trajectory of the at least one flight in the baseline air traffic scenario, based on the aircraft data, the weather data and the inferred aircraft intent;
for at least one flight in an alternative air traffic scenario, generating an aircraft intent that fits new operational conditions to be applied to a plurality of aircraft, wherein the new operational conditions comprise one or more new air traffic management operations and one or more new air traffic procedures, and wherein the generated aircraft intent conforms to the one or more new air traffic management operations and the one or more new air traffic procedures;
computing a generated trajectory of the at least one flight in the alternative air traffic scenario using the generated aircraft intent; and computing trajectory-based analytics on each computed trajectory of the baseline and alternative air traffic scenarios using a set of metrics.

19. The system of claim 18, the operation further comprising:
comparing the trajectory-based analytics of the baseline air traffic scenario with the trajectory-based analytics of the alternative air traffic scenario;
retrieving flight track data and associated aircraft type information of at least one flight in the baseline air traffic scenario; and
computing a trajectory of each flight in the baseline air traffic scenario and in the alternative air traffic scenario using the corresponding aircraft intent.

* * * * *

UNITED STATES PATENT AND TRADEMARK OFFICE
CERTIFICATE OF CORRECTION

PATENT NO. : 10,157,549 B2
APPLICATION NO. : 15/155754
DATED : December 18, 2018
INVENTOR(S) : Luis P. D'Alto et al.

Page 1 of 1

It is certified that error appears in the above-identified patent and that said Letters Patent is hereby corrected as shown below:

In the Claims

In Column 15, Line 39, in Claim 7, after "method" insert -- of --.

In Column 18, Line 41, in Claim 18, delete "a" and insert -- the --, therefor.

Signed and Sealed this
Eleventh Day of June, 2019

Andrei Iancu
*Director of the United States Patent and Trademark Office*